United States Patent [19]
Weber

[11] Patent Number: 5,526,145
[45] Date of Patent: Jun. 11, 1996

[54] COLOR TUNED HOLOGRAPHIC OPTICAL ELEMENTS AND METHODS OF MAKING AND USING THE ELEMENTS

[75] Inventor: Andrew M. Weber, Wilmington, Del.

[73] Assignee: E. I. Du Pont de Nemours and Company, Wilmington, Del.

[21] Appl. No.: 258,036

[22] Filed: Jun. 10, 1994

[51] Int. Cl.⁶ .............................. G02B 5/32; G03H 1/26; G03H 1/04; G02F 1/1335

[52] U.S. Cl. .................. 359/15; 359/22; 359/66; 359/68; 430/1

[58] Field of Search ........................... 359/9, 15, 21, 359/64, 66, 71, 40; 430/1, 2; 252/584

[56] References Cited

U.S. PATENT DOCUMENTS

| | | | |
|---|---|---|---|
| 4,807,978 | 2/1989 | Grinberg et al. | 350/3.73 |
| 4,822,718 | 4/1989 | Latham et al. | 430/271 |
| 4,834,508 | 5/1989 | Fergason | 350/339 F |
| 4,876,165 | 10/1989 | Brewer et al. | 430/7 |
| 4,878,741 | 11/1989 | Fergason | 350/339 F |
| 4,929,060 | 5/1990 | Sugimoto et al. | 350/339 F |
| 4,959,283 | 9/1990 | Smothers et al. | 430/1 |
| 4,966,441 | 10/1990 | Conner | 350/335 |
| 4,988,151 | 1/1991 | Moss | 350/3.66 |
| 5,089,905 | 2/1992 | Sasaki et al. | 359/64 |
| 5,113,274 | 5/1992 | Takahashi et al. | 359/66 |
| 5,130,826 | 7/1992 | Takanashi et al. | 359/40 |
| 5,150,236 | 9/1992 | Patel | 359/71 |
| 5,182,180 | 1/1993 | Gambogi, Jr. et al. | 430/1 |
| 5,185,059 | 2/1993 | Nishida et al. | 156/659.1 |
| 5,229,039 | 7/1993 | Ikeda et al. | 252/582 |
| 5,232,634 | 8/1993 | Sawada et al. | 252/584 |
| 5,245,449 | 9/1993 | Ooi et al. | 359/40 |
| 5,267,060 | 11/1993 | Colton | 359/15 |

FOREIGN PATENT DOCUMENTS

| | | | |
|---|---|---|---|
| 0070322 | 1/1983 | European Pat. Off. | G09F 9/00 |
| 0407773A2 | 1/1991 | European Pat. Off. | G02B 5/32 |
| 0562839A1 | 9/1993 | European Pat. Off. | G03H 1/02 |
| 4-355451 | 5/1991 | Japan | G03F 7/031 |
| 5-313009 | 5/1992 | Japan | G02B 5/20 |
| 5-343631 | 6/1992 | Japan | H01L 27/092 |

OTHER PUBLICATIONS

Gambogi, William J., Mackara, Steven R., Trout, T. John, "Diffractive printing methods using volume holograms," Practical Holography VII: Imaging and Materials, Proceedings Reprint, SPIE—The International Society for Optical Engineering, Feb. 1–2, 1993, San Jose, CA, vol. 1914, pp. 145–154.

*Primary Examiner*—Paul M. Dzierzynski
*Assistant Examiner*—Audrey Chang
*Attorney, Agent, or Firm*—Thomas H. Magee

[57] ABSTRACT

The present invention relates to color tuned holographic multicolor optical elements for use as multicolor transmission filters in liquid crystal displays and methods of making the elements. The element comprises at least first and second pixel volumes containing holographic mirrors and preferably third pixel volumes containing holographic mirrors. Each set of pixel volumes passes a different color wavelength band and reflects other color wavelength bands.

16 Claims, 6 Drawing Sheets

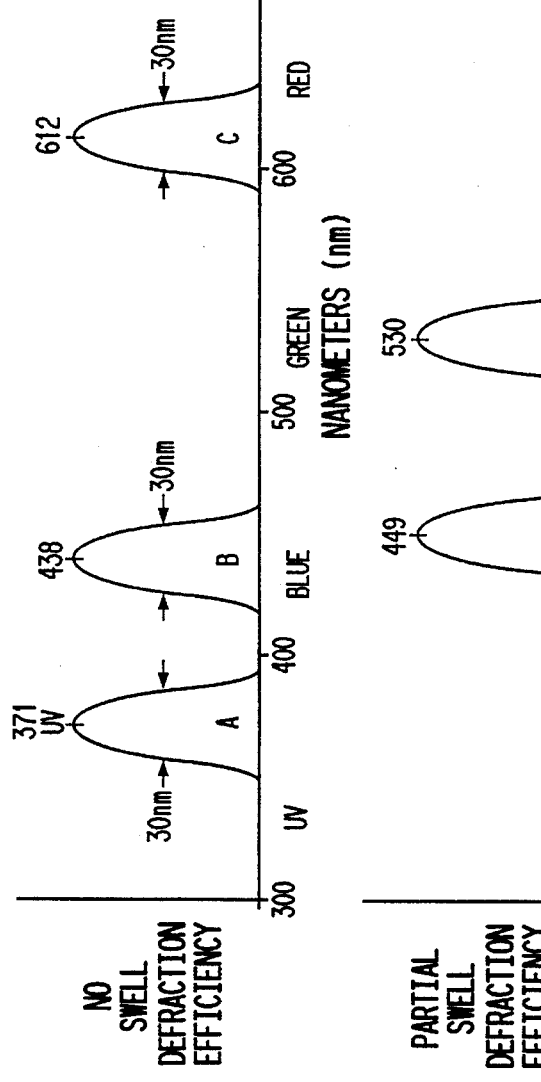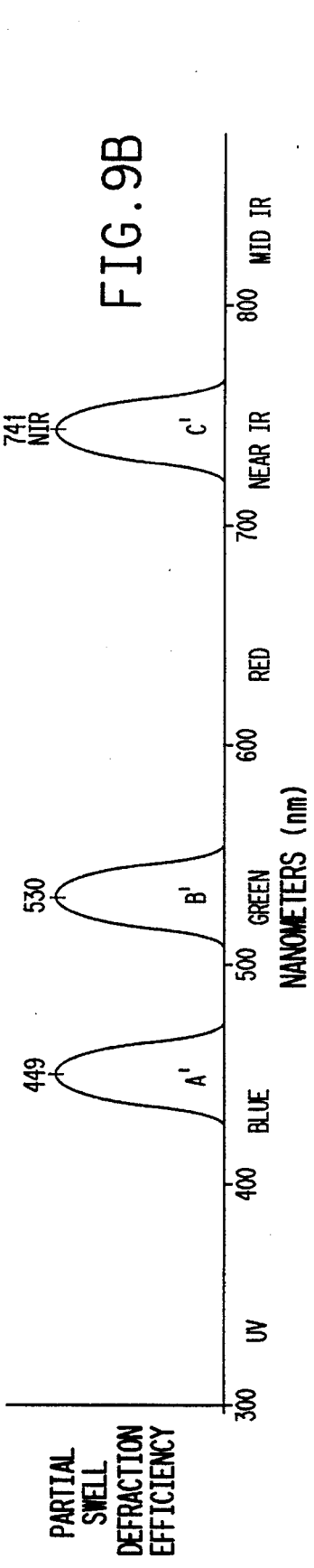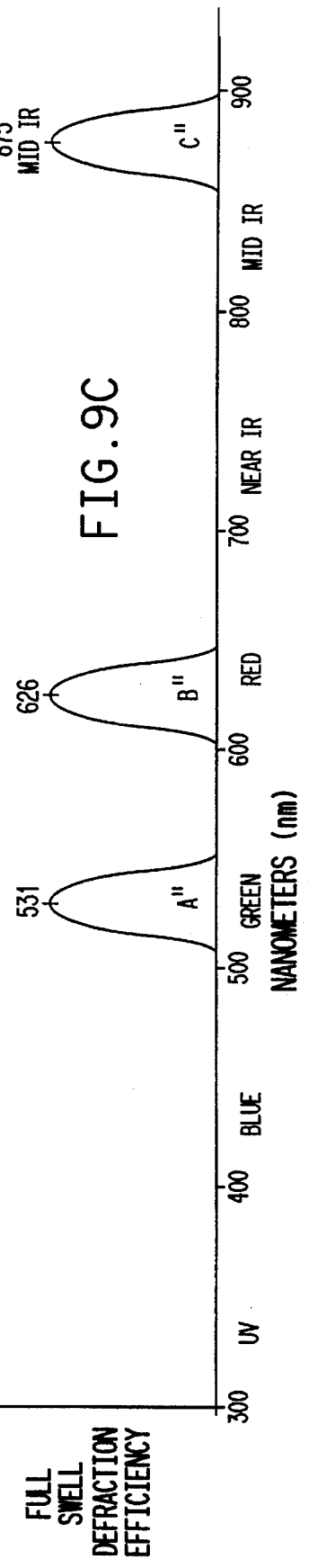

COLOR TUNED HOLOGRAPHIC OPTICAL ELEMENTS AND METHODS OF MAKING AND USING THE ELEMENTS

CROSS REFERENCES TO RELATED APPLICATIONS

This is related to copending U.S. patent application Ser. No. 08/258,638 filed Jun. 10, 1994, concurrently with this application.

BACKGROUND OF THE INVENTION

1. Field of the Invention

This invention relates to holographic multicolor optical elements for use as multicolor filters in liquid crystal displays and methods of making the elements.

2. Description of Related Art

Multicolor liquid crystal display (LCD) assemblies have many uses including displays in vehicle dashboards, watches, calculators, televisions, computers, video camera view finders, etc. Conventional multicolor LCD assemblies are adapted to display images by transmitting light of different colors, typically red, green or blue, through selected miniature areas of a surface called pixels. Illustrative multicolor LCD assemblies are disclosed in U.S. Pat. Nos. 4,834,508, 4,878,741, 4,929,060, 4,966,441, 5,089, 905, 5,113,274, 5,130,826, 5,150,236 and 5,245,449.

Conventional multicolor LCD assemblies typically use absorptive filters to absorb light except the desired color to be transmitted through each pixel. Illustrative absorptive filters for use in multicolor LCD assemblies are disclosed in U.S. Pat. Nos. 4,822,718, 4,876,165, 4,966,441, 5,185,059, 5,229,039, and 5,232,634 and in Japanese patent publications JP-04355451, JP-05313009-A and JP-05343631. In certain instances, as in U.S. Pat. No. 4,229,039, the color filter material has a dual role and also functions as an orientation layer in addition to a color filter.

The absorptive filters rely on a high concentration of particular dyes to insure sufficient absorption of background light and unwanted light of two colors out of the red, green and blue colors. The absorptive dyes typically absorb broad bands of light which restricts the colors, shades and resolution of the display. Further, the absorptive dyes are frequently not highest in transmission at the desired wavelength. Large absorptive filters are difficult to manufacture with high quality especially when pixel size is small throughout the filter. It is also desirable to find a lighter weight alternative to conventional absorptive filters.

SUMMARY OF THE INVENTION

The invention relates to a color tuned volume holographic optical element, comprising:

a photohardened holographic recording film element comprising at least a first plurality of pixel volumes and a second plurality of pixel volumes arranged in rows and columns;

each one of the first pixel volumes including a color tuned volume holographic mirror that passes light with at least a first color (e.g., Red) wavelength band and reflects light with at least another color (e.g., Green) wavelength band; and each one of the second pixel volumes including a volume holographic mirror that passes light with at least the another color (e.g., Green) wavelength band and reflects light with at least the first color (e.g., Red) wavelength band.

The invention further relates to a color tuned volume holographic optical element, comprising:

a photohardened holographic recording film element comprising a first plurality of pixel volumes, a second plurality of pixel volumes, and a third plurality of pixel volumes;

each one of the first pixel volumes including a color tuned volume holographic mirror that passes light with a first color (e.g., Red) wavelength band and reflects light with a second color (e.g., Green) wavelength band, a third color (e.g., Blue) wavelength band and a fourth color (e.g., NIR) wavelength band;

each one of the second pixel volumes including a non-color tuned volume holographic mirror that passes light with the second color (e.g., Green) wavelength band and reflects light with the first color (e.g., Red) wavelength band, the third color (e.g., Blue) wavelength band and a fifth color (e.g., UV) wavelength band; and each one of the third pixel volumes including a color tuned volume holographic mirror that passes light with the third color (e.g., Blue) wavelength band and reflects light with the first color (e.g., Red) wavelength band, the second color (e.g., Green) wavelength band and a sixth color (e.g., mid IR) wavelength band.

The invention is further directed to a first method for making a first color tuned volume holographic optical element, comprising:

a holographic recording film element comprising a first plurality of pixel volumes, a second plurality of pixel volumes, and a third plurality of pixel volumes;

each one of the first pixel volumes including a color tuned volume holographic mirror that passes light with a first color (e.g., Red) wavelength band and light with a second color (e.g., Green) wavelength band, a third color (e.g., Blue) wavelength band and a fourth color (e.g., near IR) wavelength band;

each one of the second pixel volumes including a non-color tuned volume holographic mirror that passes light with the second color (e.g., Green) wavelength band and reflects light with the first color (e.g., Red) wavelength band, the third color (e.g., Blue) wavelength band and a fifth color (e.g., UV) wavelength band; and each one of the third pixel volumes including a color tuned volume holographic mirror that passes light with the third color (e.g., Blue) wavelength band and reflects light with the first color (e.g., Red) wavelength band, the second color (e.g., Green) wavelength band and a sixth color (e.g., mid IR) wavelength band; the method comprising:

holographically exposing the film element with coherent or substantially coherent light to record a second volume holographic optical element adapted to uniformly reflect light having a fifth color (e.g., UV) wavelength band, the third color (e.g., Blue) wavelength band and the first color (e.g., Red) wavelength band;

contacting a solid or substantially solid diffusing element containing a diffusable monomer with the film element; and imagewise exposing the diffusing element to actinic radiation to polymerize the monomer to varying degrees to selectively modify the wavelength response of the holographic optical element by the diffusion of monomer from the diffusion element to form the first color tuned volume holographic optical element.

The invention is further directed to a second method for making a first color tuned volume holographic optical element, comprising:

a holographic recording film element comprising a first plurality of pixel volumes, a second plurality of pixel volumes, and a third plurality of pixel volumes;

each one of the first pixel volumes including a color tuned volume holographic mirror that passes light with a first color (e.g., Red) wavelength band and reflects light with a second color (e.g., Green) wavelength band, a third color (e.g., Blue) wavelength band and a fourth color (e.g., near IR) wavelength band;

each one of the second pixel volumes including a non-color tuned volume holographic mirror that passes light with the second color (e.g., Green) wavelength band and reflects light with the first color (e.g., Red) wavelength band, the third color (e.g., Blue) wavelength band and a fifth color (e.g., I/V) wavelength band; and each one of the third pixel volumes including a color tuned volume holographic mirror that passes light with the third color (e.g., Blue) wavelength band and reflects light with the first color (e.g., Red) wavelength band, the second color (e.g., Green) wavelength band and a sixth color (e.g., mid IR) wavelength band; the method comprising:

holographically exposing the film element with coherent or substantially coherent light to record a second volume holographic optical element adapted to uniformly reflect light having a fifth color (e.g., UV) wavelength band, the third color (e.g., Blue) wavelength band and the first color (e.g., Red) wavelength band;

imagewise exposing a solid or substantially solid diffusing element containing a diffusable monomer to actinic radiation to polymerize the monomer to varying degrees; and contacting the film element with the diffusing element for a time sufficient to selectively modify the wavelength of light response by the second volume holographic optical element by diffusion of the monomer from the solid diffusing element to form the first color tuned volume holographic optical element.

BRIEF DESCRIPTION OF THE DRAWINGS

The invention can be more fully understood from the following detailed description thereof in connection with accompanying drawings described as follows.

FIGS. 9A, 9B and 9C are graphs of relative diffraction efficiency versus wavelength for a non-color tuned optical element, a partially color tuned optical element and a fully color tuned optical element, respectively.

DESCRIPTION OF THE PREFERRED EMBODIMENT(S)

Figure 1:
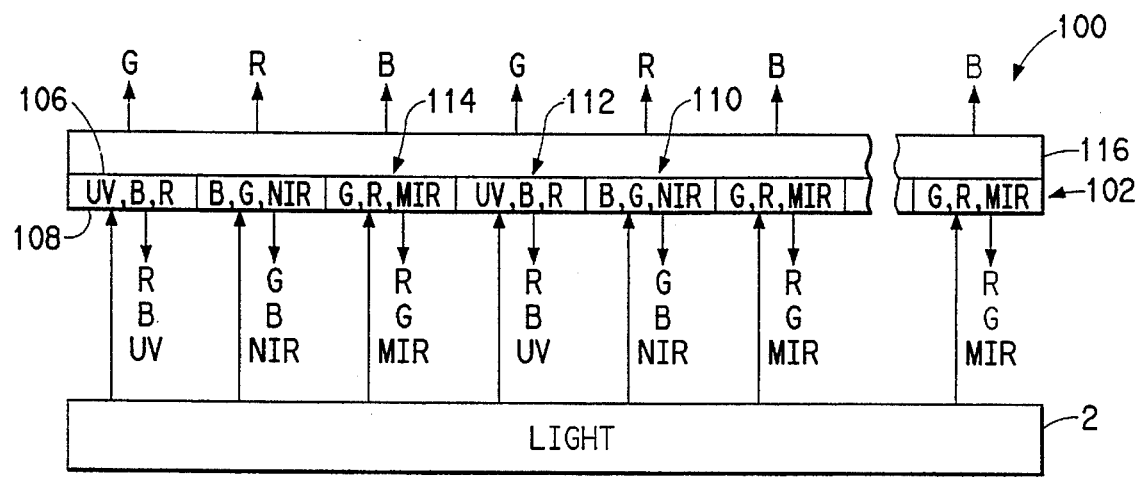
FIG. 1 illustrates a color tuned volume holographic optical element filtering light from a light source in accordance with the present invention.

Throughout the following detailed description, similar reference characters refer to similar elements in all figures of the drawings.

Referring to FIG. 1, there is illustrated a first color tuned volume holographic optical element 100 in accordance with the present invention. The color tuned volume holographic optical element 100 comprises a holographic recording film element 102 having a first surface 106 and a second surface 108. The first holographic recording film element 102 comprises at least a first plurality of pixel volumes 110 and a second plurality of pixel volumes 112. Preferably, the first holographic recording film element 102 further comprises a third plurality of pixel volumes 114. Preferably, the first plurality of pixel volumes 110, the second plurality of pixel volumes 112 and the third plurality of pixel volumes 114 are arranged in rows and columns. The first holographic recording film element 102 can be a single layer or more than one layer.

Each one of the first pixel volumes 110 includes a color tuned volume holographic mirror that passes light with at least a first color (e.g., Red) wavelength band and reflects light with at least another color (e.g., Green) wavelength band. Each one of the second pixel volumes 112 includes a volume holographic mirror that passes light with at least the another color (e.g., Green) wavelength band and reflects light with at least the first color (e.g., Red) wavelength band. In one embodiment, such as where the first color wavelength band is Red light and the second color wavelength band is Green light, the volume holographic mirrors in the first pixel volumes 110 are color tuned and the holographic mirrors in the second pixel volumes 112 are not color tuned. In another embodiment, such as where the first color wavelength band is Red light and the second color wavelength band is Blue light, the volume holographic mirrors in both the first pixel volumes 110 and the second pixel volumes 112 are color tuned.

Preferably, each one of the first pixel volumes 110 includes a color tuned first volume holographic mirror that passes light with a first color (e.g., Red) wavelength band and reflects light with a second color (e.g., Green) wavelength band, a third color (e.g., Blue) wavelength band and a fourth color (e.g., near IR) wavelength. Preferably, each one of the second pixel volumes 112 includes a non-color tuned second volume holographic mirror that passes light with the second color (e.g., Green) wavelength band and reflects light with the first color (e.g., Red) wavelength band, the third color (e.g., Blue) wavelength band and a fifth color (e.g., I/V) wavelength band. Preferably, each one of the third pixel volumes 114 includes a color tuned third volume holographic mirror that passes light with the third color (e.g., Blue) wavelength band and reflects light with the first color (e.g., Red) wavelength band, the second color (e.g., Green) wavelength band and a sixth color (e.g., mid IR) wavelength band.

The holographic mirrors are formed by fringes or gratings. The gratings of all holographic mirrors disclosed herein can be of any shape or slant achieved by conventional holographic methods. The gratings can be conformal gratings which are parallel to the surfaces 106,108 of the recording medium and/or non-conformal gratings which are non-parallel to the surfaces 106,108.

The operation or function of one embodiment of the color tuned volume holographic optical element 100 is illustrated in FIG. 1. Specifically, a light source 2 is illustrated providing light towards the color tuned photohardened holographic recording film element 100. The light source 2 can emit light which includes the first color (e.g., Red) wavelength band, the second color (e.g., Green) wavelength band, the third color (e.g., Blue) wavelength band, the fourth color (e.g., Near Infrared) wavelength band, the fifth color (e.g., Ultraviolet) wavelength band, and/or the sixth color (e.g., Mid Infrared) wavelength band. The letters in FIG. 1 designating the color wavelength bands and the associated arrows illustrate whether the element 100 will pass or reflect the specific color wavelength band assuming that the light source 2 emits actinic radiation in such color wavelength band. Preferably, if the light source 2 also emits color wavelength bands other than the first, second, third, fourth, fifth and sixth color wavelength bands, such wavelength bands would also pass through the color tuned volume holographic optical element 100. The light source 2 can emit coherent, substantially coherent or noncoherent light. The color tuned volume holographic optical element 100 functions the same regardless of which side of the volume holographic optical element 100 the light source 2 is positioned.

The first color wavelength band, the second color wavelength band, the third color wavelength band, the fourth color wavelength band, the fifth color wavelength band and the sixth color wavelength band are distinct wavelength bands of light separated by other wavelength bands. Preferably, light having the first color wavelength band has a bandwidth of at least 5 nanometers (and more preferably within about 20–30 nanometers) and includes 612 nanometer which appears Red and is designated R in the Figures. Preferably, light having the second color wavelength band has a bandwidth of at least 5 nanometers (and more preferably within about 20–30 nanometers) and includes 545 nanometer which appears Green and is designated G in the Figures. Preferably, light having the third color wavelength band has a bandwidth of at least 5 nanometers (and more preferably within about 20–30 nanometers) and includes 436 nanometer which appears Blue and is designated B in the Figures. Preferably, light having the fourth color wavelength band has a bandwidth of at least 5 nanometers (and more preferably within about 20–30 nanometers) and includes 741 nanometer which is near infrared light and is designated NIR in the Figures. Preferably, light having the fifth color wavelength band has a bandwidth of at least 5 nanometers (and more preferably within about 20–30 nanometers) and includes 371 nanometer which is ultraviolet light and is designated UV in the Figures. Preferably, light having the sixth color wavelength band has a bandwidth of at least 5 nanometers (and more preferably within about 20–30 nanometers) and includes 875 nanometer which is mid-infrared light and is designated MIR in the Figures. Unless otherwise indicated, the color band designations in all pixel volumes throughout the Figures illustrate the color wavelength band(s) that is/are reflected by the pixel volume and all other color wavelengths pass through the pixel volumes. When two or more of these color band designations are listed together, it refers to light consisting essentially of the wavelength bands of each of the designated color bands.

The first pixel volumes 110, the second pixel volumes 112 and the third pixel volumes 114 can be any shape and in any order in the recording film element 102. However, the volumes 110,112,114 do have sides which are part of the first and second surfaces 106,108 of the film element 102. FIG. 1 depicts one row of a preferred embodiment of a two dimensional array of the volumes 110,112,114. Preferably, the pixels volumes 110,112,114 are ordered in each row of the array in a repeating sequence of one of the first pixel volumes 110, then one of the second pixel volumes 112, and then one of the third pixel volumes 114. The pixel volumes 110,112,114 in adjacent rows can be offset with respect to one another such that an intersection line between each pair of adjacent pixel volumes in one row is collinear or substantially collinear with a line that bisects a corresponding one of the pixel volumes in an adjacent row.

The first holographic optical element 100 further optionally comprises a dimensionally stable substrate 116 having a planar surface supporting the first surface 106 of the film element 102.

Figure 2:
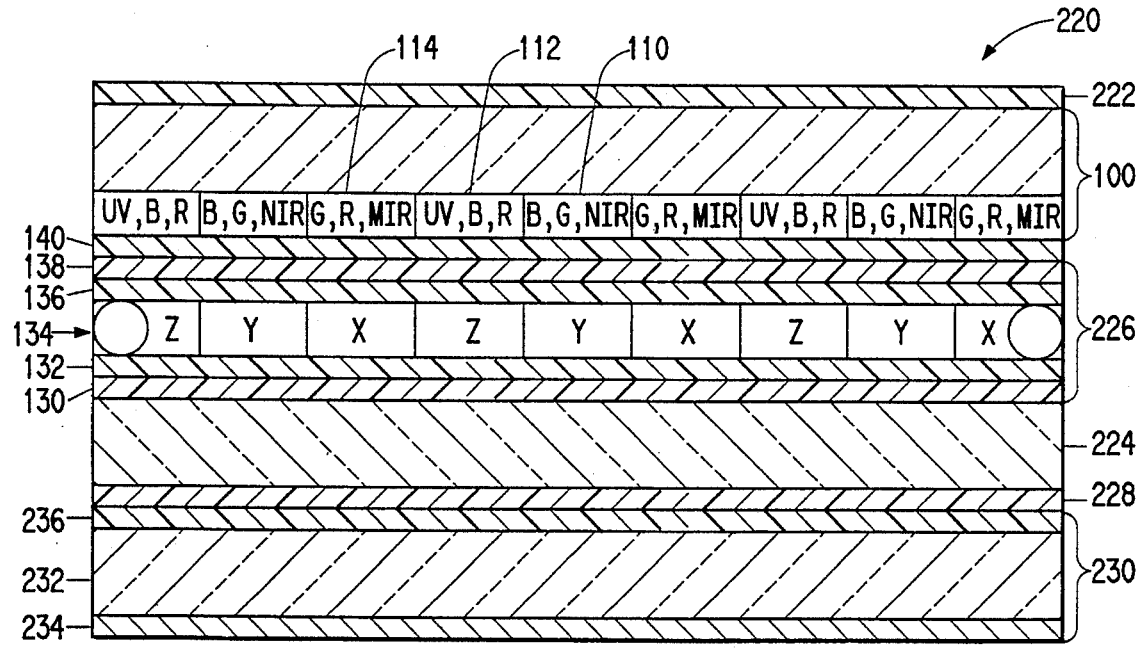
FIG. 2 illustrates the color tuned volume holographic optical element used as a multicolor transmission filter in a liquid crystal display apparatus.

FIG. 2 illustrates the color tuned volume holographic optical element 100 used as a multicolor transmission filter in a liquid crystal display 220. The transmission liquid crystal display apparatus comprises, in order, a first light polarizer 222, the holographic multicolor transmission filter 100, a liquid crystal display element 226, a first dimensionally stable substrate 224, a second light polarizer 228, and a light assembly 230.

The light assembly 230 can comprise a light source 232, a reflector or intensifier 234, and a prefilter 236. The light source 232 emits light with the first color (e.g., Red) wavelength band, the second color (e.g., Green) wavelength band and the third color (e.g., Blue) wavelength band. The light source 232 may also emit light with other wavelength bands. In this case, the prefilter 236 is included to block passage of the other wavelength bands.

Figure 3:
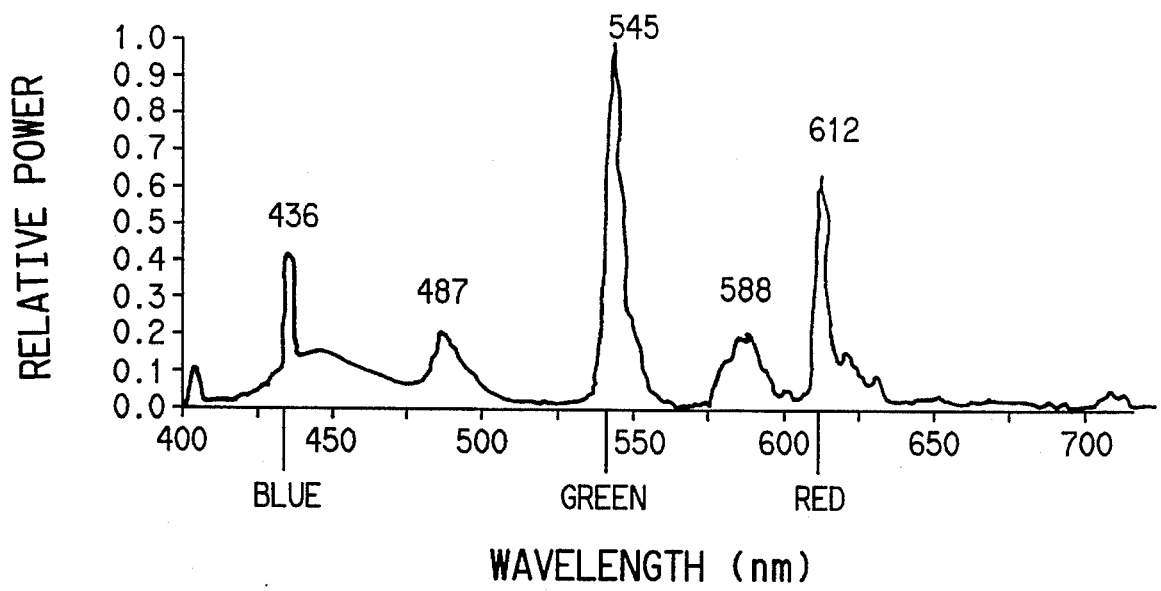
FIG. 3 is a graph of relative spectral power versus wavelength for a typical multicolor liquid crystal display light source.

FIG. 3 is a graph of relative spectral power (e.g., milliwatts) versus wavelength (λ) for a typical multicolor liquid crystal display light source. The prefilter 236 could be made to block passage of light having wavelength bands of about 400–425, 474–500, and 575–595 nanometers. Preferably, the prefilter 236 is a volume holographic optical element adapted to pass the first color (e.g., Red) wavelength band, the second color (e.g., Green) wavelength band and the third color (e.g., Blue) wavelength band and to reflect other wavelength bands, such as wavelength bands of about 400–425, 474–500, and 575–595 nanometers.

The second light polarizer 228 is for linearly polarizing light from the light assembly 230 such that light having only a first polarization passes through the polarizer 228.

The liquid crystal display element 226 passes light or polarized modified light to the filter 100. The liquid crystal display element 226 is well known by those skilled in the art and is for selectively modifying the polarization of the light passing through an array of cells X,Y,Z such that the polarization of light passing through a first set of the cells X, a second set of the cells Y or a third set of the cells Z can be changed to a second linear polarization. Illustrative liquid crystal display elements are disclosed in the publications cited in the Background of the Invention section of this specification. The second polarization is typically perpendicular to the first polarization. The liquid crystal display element 126 can comprise, in order, a first circuitry layer 130, a first alignment layer 132, a liquid crystal layer 134, a second alignment layer 136, a second circuitry layer 138, and a leveling layer 140. The circuitry layer 130 provides a first side of an electrical drive circuit capable of modifying a particular first side orientation of liquid crystals in the liquid crystal layer 134 through the first alignment layer 132. The liquid crystal layer 134 confines liquid crystals in cells corresponding to each pixel volume in the filter 100. The second alignment layer 136 introduces a particular second side orientation to the liquid crystals in the liquid crystal layer 134. The second circuitry layer 138 provides a second side of the electrical drive circuit capable of modifying the particular second side orientation of liquid crystals in the liquid crystal layer 134 through the second alignment layer 136. The leveling layer 140 provides a rigid planar surface for the filter 100.

The first light polarizer 222 passes light from the filter 200 having only the second polarization and blocks light of other polarizations.

In operation, when the liquid crystal display element 226 modifies or rotates the polarization of the light passing through the first set of cells X to the second polarization, the light passes into the first pixel volumes 110 in which the first volume holographic mirrors pass light with the first color (e.g., Red) wavelength band through the first polarizer 222 to a viewer. When the liquid crystal display element 226 modifies or rotates the polarization of the light passing through the second set of cells Y to the second polarization, the light passes into the second pixel volumes 112 in which the second volume holographic mirrors pass light with the second color (e.g., Green) wavelength band through the first polarizer 222 to the viewer. When the liquid crystal display element 226 modifies or rotates the polarization of the light passing through the third set of cells Z to the second polarization, the light passes into the third pixel volumes 114 in which the third volume holographic mirrors pass light with the third color (e.g., Blue) wavelength band through the first polarizer 222 to the viewer.

Figure 4:
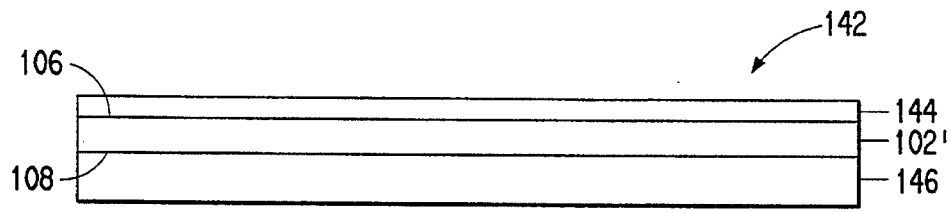
FIG. 4 illustrates a photohardenable holographic recording film element.

FIG. 4 depicts a holographic recording film element 142 that can be used in making the first color tuned volume holographic optical element 100. The holographic recording film element 142 comprises, in turn, a cover sheet 144, an unimaged, unexposed holographic recording film element or layer 102' and a dimensionally stable support 146.

Figure 5:
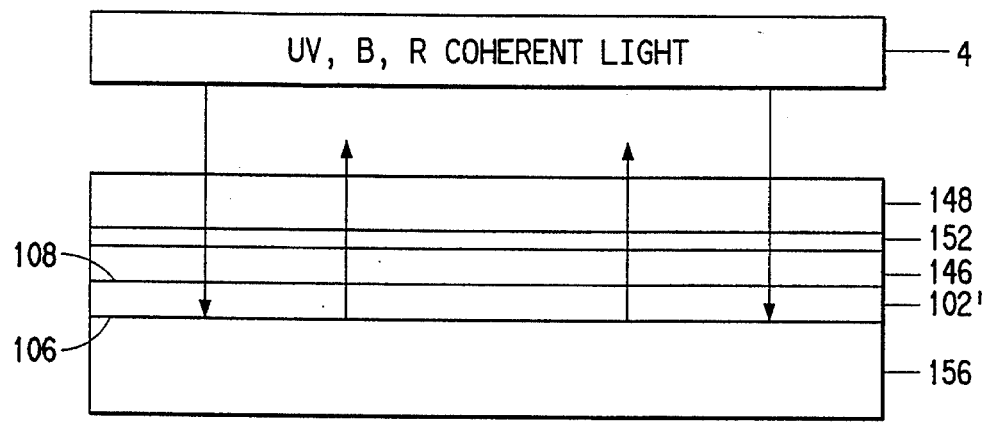
FIG. 5 illustrates holographically imaging the recording film element to record a volume holographic optical element in the film element.

A method for making a preferred embodiment of the first color tuned volume holographic optical element 100 will now be described starting with the unimaged, unexposed holographic recording film element 102'. The holographic recording film element 102' is fully sensitized. The cover sheet 144 is removed from the first surface 106 of the holographic recording film layer 102'. The first surface 106 of the film layer 104' is laminated on a reflector 156, such as a front surface mirror. An anti-reflection plate 148 is coupled through a first index matching fluid layer 152 to the dimensionally stable support 146. This results in a laminate structure which is depicted in FIG. 5.

Next, a light source 4 is selected adapted to simultaneously emit coherent or substantially coherent light consisting essentially of the first color (e.g., Red) wavelength band, the third color (e.g., Blue) wavelength band and the fifth color (e.g., UV) wavelength band. The light source can be any convenient light source that provides actinic radiation of appropriate wavelengths and intensity to initiate photopolymerization in the recording film layer 102'. Conventional sources of actinic radiation include fluorescent, mercury vapor, mercury-xenon, metal additive and arc lamps. Useful sources of coherent radiation are lasers whose emissions fall within or overlap the absorption bands of the initiator system in the recording film layer 102'. Light from the light source 6 is directed, in turn, through the anti-reflection plate 148, the holographic recording film layer 102' onto the reflector 156. The reflector 156 reflects the light back through the holographic recording film layer 102' such that the reflected light interferes with the light passing through the film layer 102' towards the reflector 156. This interference holographically images or imagewise holographically exposes the holographic film layer 102' to record a second volume holographic optical element in the form of a holographic mirror adapted to uniformly reflect light consisting essentially of the fifth color (e.g., UV) wavelength band, the third color (e.g., Blue) wavelength band and the first color (e.g., Red) wavelength band. The holographic mirror is a volume phase hologram. The volume phase hologram can be a reflection hologram or a transmission hologram. Preferably, it is a reflection hologram. The holographic film layer 102' recorded to be the second volume holographic optical element in the form of a holographic mirror is designated layer 102" in the Figures. Preferably, as illustrated in FIG. 5, holographic imaging or imagewise holographic exposing is performed in a single step which occurs for about 20 seconds. However, alternatively, this holographic imaging can be performed in multiple steps. For instance, light having only the first (e.g., Red) wavelength band can be directed from the light source 6 through the laminate depicted in FIG. 5 recording a first holographic mirror in the layer 102' that uniformly reflects the first (e.g., Red) wavelength band through out the layer 102'. Then light having only the third (e.g., Blue) wavelength band can be directed from the light source 6 through the laminate depicted in FIG. 5 recording a second holographic mirror in the layer 102' that uniformly reflects the third (e.g., Blue) wavelength band through out the layer 102'. Then light having only the fifth (e.g., Ultraviolet) wavelength band can be directed from the light source 6 through the laminate depicted in FIG. 5 recording a third holographic mirror in the layer 102' that uniformly reflects the fifth (e.g., Ultraviolet) wavelength band through out the layer 102'. Of course, the different light bands may be directed to holographically expose the layer 102' in any order.

Figure 6:
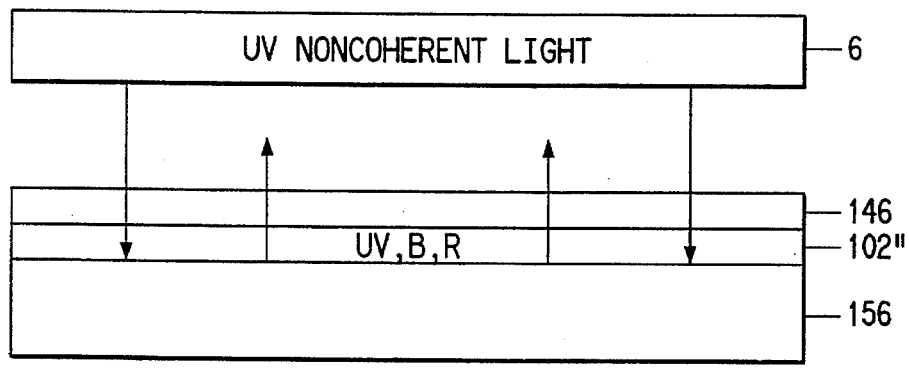
FIG. 6 illustrates curing the holographic recording film element.
Figure 7:
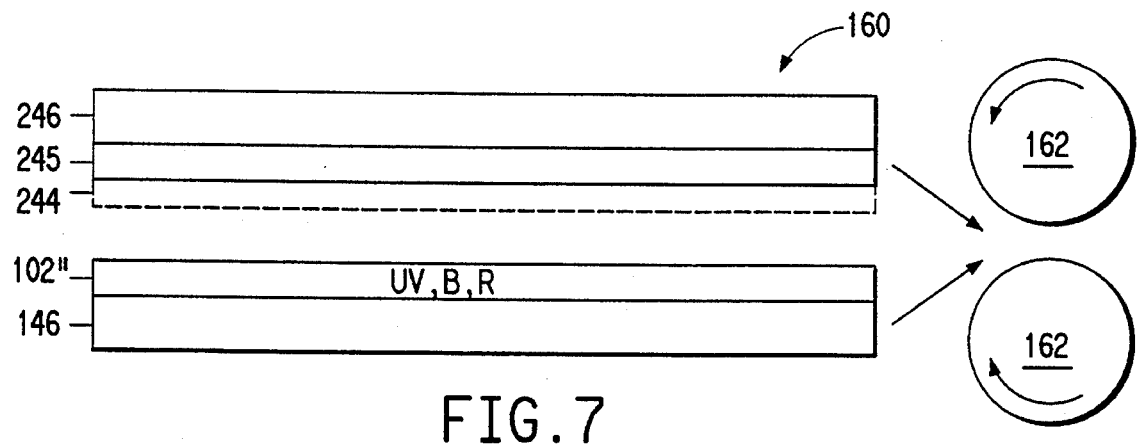
FIG. 7 illustrates contacting the recording film element with a diffusing element.

After the anti-reflection plate 148 and the first index matching fluid layer 152 are removed, the resulting laminate structure can be optionally cured, fixed or exposed to substantially polymerize any monomer and fix the holographic mirror in the laminate structure. The cured layer is referred to by the number 102" in the Figures. This can be accomplished, as illustrated in FIG. 6, by using noncoherent actinic radiation, such as from a broad band ultraviolet light source 6, to flood expose the laminate structure. Throughout this application, the term "broad band ultraviolet light" means light in the spectral region of about 300 through 450 nanometers. This step provides an exposure level of about 100 millijoules per squared centimeter ($mJ/cm^2$), but the exposure level can be greater. This step typically occurs for about one minute, but can occur longer. This step photo hardens or substantially photo hardens any remaining photosensitive material in the laminate structure.

After the reflector 156 is removed, a solid or substantially solid diffusing element 160 is laminated or applied to the layer 102". The diffusing element 160 can comprise, in turn, a cover sheet 244, a diffusing layer 245 with the diffusable monomer in the layer 245 and a dimensionally stable support 246. The cover sheet 244 is removed from the diffusing layer 245. Then the diffusing layer is placed in contact with the holographic recording film element 102". Pressure and heat can be applied such as through a pair of heated rollers 162 to ensure good contact between the layers.

Figure 8:
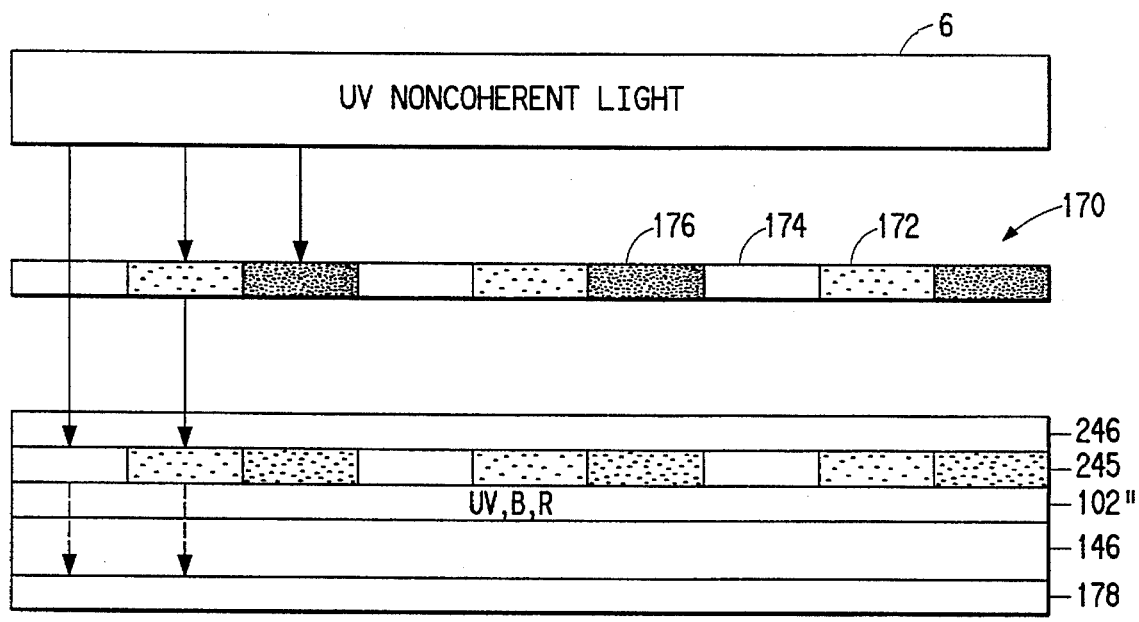
FIG. 8 illustrates imagewise exposing the diffusing element to actinic radiation to polymerize diffusable monomer to varying degrees to color tune or selectively modify the wavelength response of the holographic recording film element.

Then the diffusing element 245 is imagewise exposed to actinic radiation to polymerize the monomer to varying degrees to selectively modify the wavelength response of the holographic optical element 102" by the diffusion of monomer from the diffusion element 245 to form the first color tuned volume holographic optical element. FIG. 8 illustrates one way of doing this. Again light source 6 can be used. A photomask 170 can be used having a first set of pixels 172, a second set of pixels 174 and a third set of pixels 176. The first set of pixels 172 is partially transparent to light from light source 6. The second set of pixels 174 is completely transparent to light from light source 6. The third set of pixels 176 is opaque or completely blocks light from light source 6. Light from light source 6 is directed, in turn, through the photomask 170, the diffusing element 245, and the first holographic optical element 102". An antihalation layer 178 can be laminated to the substrate 146 to reduce reflection and/or refraction of the light back through the holographic optical element 102". Following diffusion, the regions of the hologram in contact with the unexposed regions of the diffusion element 245 will be shifted to longer response wavelengths than the regions of the hologram in contact with the exposed regions of the diffusion element 245. More specifically, light that passes through the first set of pixels 172 partially polymerizes the diffusable monomer in the pixels 172. This reduces the amount of monomer that diffuses from the diffusing element 245 into the first set of pixel volumes 110 which partially swells the first pixel volumes 110. Light that passes through the second set of pixels 174 completely or substantially completely polymerizes the diffusable monomer in the pixels 174. This prevents monomer from diffusing from the diffusing element 245 into the second set of pixel volumes 112 which remain the same, i.e., no swell. Since light does not pass through the third set of pixels 176, diffusable monomer in the pixels 176 does not polymerize. This allows as much monomer as possible to diffuse from the diffusing element 245 into the third set of pixel volumes 114 which fully swells the third pixel volumes 114.

FIGS. 9A–9C illustrate this process. FIGS. 9A–C are graphs of relative diffraction efficiency versus wavelength reflected by a non-color tuned optical element (or non-color tuned pixel volumes), a partially color tuned optical element (or partially tuned pixel volumes) and a fully color tuned optical element (or fully color tuned pixel volumes), respectively. In FIG. 9A, bell curves exist at the first, third, and fifth color wavelength bands centered about 612 nanometer, 438 nanometer, and 371 nanometer, respectively. In FIG. 9B, bell curves exist at the second, third, and fourth color wavelength bands centered about 530 nanometer, 449 nanometer, and 741 nanometer, respectively. In FIG. 9C, bell curves exist at the first, second, and sixth color wavelength bands centered about 626 nanometer, 531 nanometer, and 875 nanometer, respectively. The shape of the curves is only illustrative and the holographic mirrors can be designed to reflect bands of light having various curves when plotted against relative spectral power. Each of the first through sixth bands has an average bandwidth of about 30 nanometers.

FIG. 9A illustrates performance of the second holographic optical element 102' formed by the holographic exposing illustrated in FIG. 5. The second holographic optical element 102' reflects light having the first, third and fifth color wavelength bands. All other light including the Green wavelength band passes through the second holographic optical element 102'. Since no monomer diffuses into the second pixel volumes 112, FIG. 9A also illustrates the performance of the second pixel volumes 112 in the first holographic optical element 100 formed by the color tuning step illustrated in FIG. 8.

FIG. 9B illustrates the situation where some monomer diffuses into the first pixel volumes 110 partially swelling them. This moves the performance of the first pixel volumes slightly towards the MIR end of the light spectrum. As such, FIG. 9B illustrates performance of the first pixel volumes 110 in the holographic optical element 102 formed by the color tuning step illustrated in FIG. 8. More specifically, FIG. 9B illustrates a 21% swelling of the holographic mirrors illustrated in FIG. 9A. The first pixel volumes 110 in the holographic optical element 102 reflect light having the second, third and fourth color wavelength bands. All other light including the Red wavelength band passes through the first pixel volumes 110.

FIG. 9C illustrates the situation where unhindered monomer diffuses into the third pixel volumes 114 fully swelling them. This moves the performance of the third pixel volumes closer to the MIR end of the light spectrum. As such, FIG. 9C illustrates performance of the third pixel volumes 114 in the holographic optical element 102 formed by the color tuning step illustrated in FIG. 8. More specifically, FIG. 9C illustrates a 43% swelling of the holographic mirrors illustrated in FIG. 9A. The third pixel volumes 114 in the holographic optical element 102 reflect light having the first, second, and sixth color wavelength bands. All other light including the Blue wavelength band passes through the third pixel volumes 114.

Figure 10:
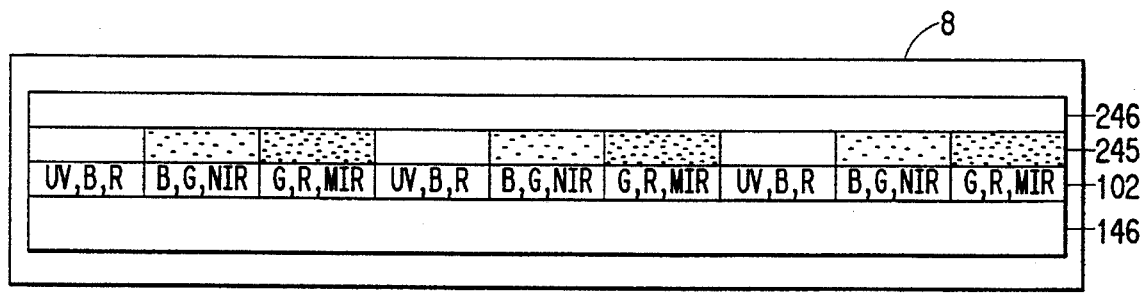
FIG. 10 illustrates heating the holographic recording film element.

After the imagewise exposing and contacting steps, the antihalation layer 178 is removed. Then, the holographic recording film can be heated, such as in an oven 8, to increase the refractive index modulation, efficiency and bandwidth of the holographic mirrors. See FIG. 10.

The steps illustrated by FIGS. 6–10 convert the non color tuned layer 102" into color tuned layer 102.

Figure 11:
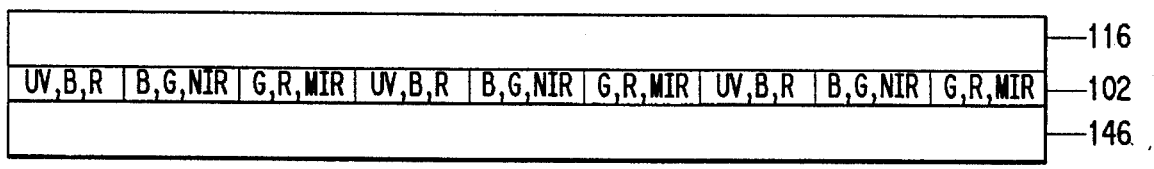
FIG. 11 illustrates attaching a support layer to the color tuned holographic recording film forming the holographic optical element.

FIG. 11 illustrates the steps of removing the diffusing element 245 and its substrate 246 and laminating the layer 102 to the dimensionally stable support 116. When the substrate 246 is removed, this results in the first holographic optical element 100 illustrated in FIG. 1. Alternatively, the diffusing element 245 can remain on the layer 102 and become part of the first holographic optical element 100.

Using the wavelength bands illustrated in FIGS. 9A–C, the resulting first holographic optical element 100 can be used as a filter in an LCD apparatus that uses a light source with a power distribution as illustrated in FIG. 3. The first holographic optical element 100 can have different wavelength bands and bandwidths than those illustrated in FIGS. 9A–C in which case it can be used to filter a light source for an LCD apparatus with relative power peaks designed or selected to correspond to the relative power peaks filtered by the element 100.

Figure 12:
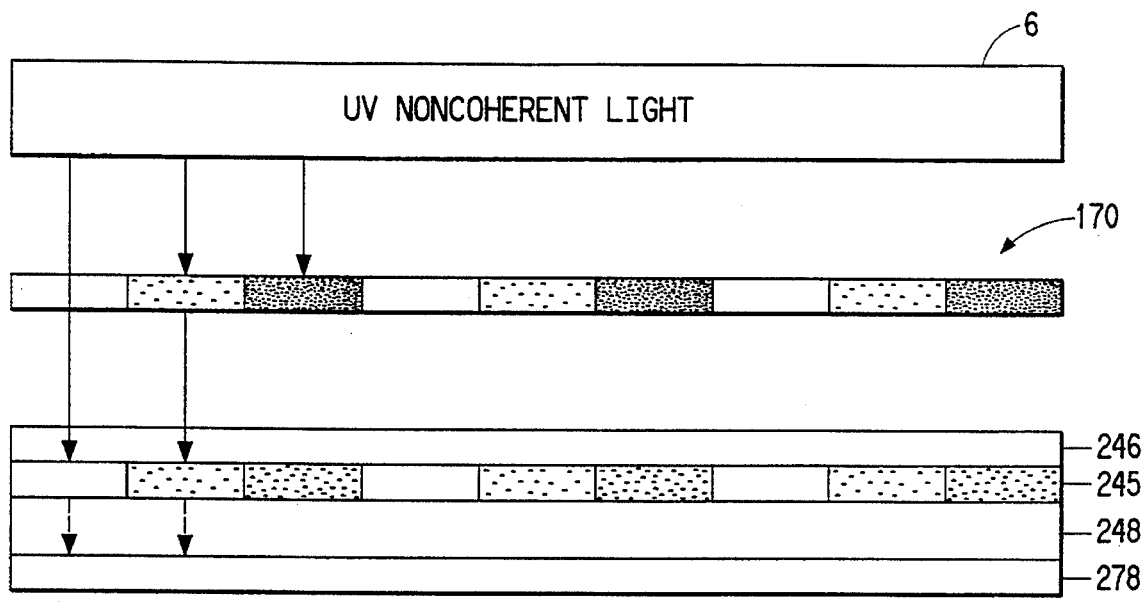
FIG. 12 illustrates imagewise exposing the diffusing element to actinic radiation to polymerize diffusable monomer to varying degrees.
Figure 13:
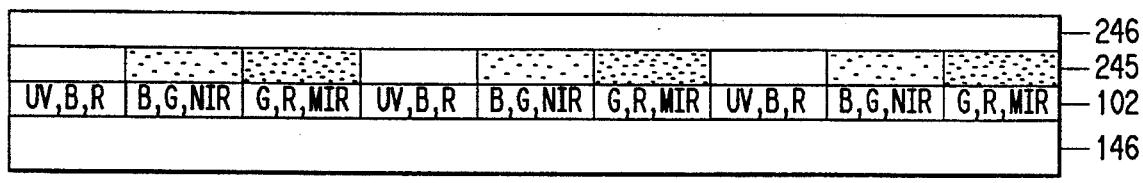
FIG. 13 illustrates contacting the recording film element with the diffusing element for a time sufficient to color tune or selectively modify the wavelength of light response by the recording film element.

FIGS. 12 and 13 illustrate an alternative method for making the first color tuned volume holographic optical element 100. This second method is the same as the first method, except in this method the diffusing element 245 is imagewise exposed to actinic radiation to polymerize the monomer to varying degrees before it is placed in contact with the layer 102'. The diffusing element 245 and the layer 102' are placed in contact for a time sufficient to selectively modify the wavelength of light response of the second volume holographic optical element 102' by diffusion of the monomer from the solid diffusing element 245 to form the first color tuned volume holographic optical element 100.

FIG. 12 illustrates directing light from light source 6, in turn, through the photomask 170, the substrate 246, the diffusing element 245, another dimensionally stable substrate 248 and into an antihalation layer 278. This imagewise exposes the diffusing element 245 to actinic radiation to polymerize the monomer to varying degrees.

Then, as illustrated in FIG. 13, the substrate 248 and the antihalation layer 278 are removed and the film element is contacted with the diffusing element 245 for a time sufficient to selectively modify the wavelength of light response of the second volume holographic optical element by diffusion of the monomer from the solid diffusing element to form the first color tuned volume holographic optical element. The laminate formed after the step illustrated in FIG. 13 can be heated as described in relation to the prior method.

Then the substrate 246 and optionally the diffusing element 245 are removed. A dimensionally stable substrate 116 is laminated to the layer 102. The substrate 146 is removed. The resulting laminate is the first color tuned volume holographic element 100 illustrated in FIG. 1.

In one embodiment, the first holographic recording film element 102 comprises a plurality of substantially solid, holographic recording films. Specifically, the film element 102 comprises a first holographic recording film layer, a second holographic recording film layer and a third holographic recording film layer, laminated on top of one another. In this case, the first pixel volumes 110 are formed in the first layer, the second pixel volumes 112 are formed in the second layer and the third pixel volumes 114 are formed in the third layer. One method of making this embodiment is as follows. First mirrors are holographically imaged in the first layer. Second mirrors are holographically imaged in the second layer. Third mirrors are holographically imaged in the third layer. The layers can been fully sensitized or only sensitized to the wavelength bands used to image the mirrors. Then the layers are laminated to one another. Then a diffusing element is applied to one side of the laminated layers. Then actinic radiation is directed through photomask 170, the diffusing element and the laminated layers as illustrated in FIG. 8 except the single layer 102" is replaced with the 3 laminated layers. Alternatively, the three laminated layers can be substituted for the single layer 102 in FIG. 13 to cause diffusion of monomer from the pre-exposed diffusion element.

Materials and/or Commercial Availability

The dimensionally stable substrates 116, 224 and 248 can be made of rigid transparent materials and preferably are made of glass or plastic. Each of these substrates can be the same or different.

The dimensionally stable supports 146, 246 are required to be transparent if irradiation is to be carried out through the supports. The supports 146, 246 may be any dimensionally stable material typically used with photopolymer films. Preferred materials for the supports 146, 246 are polymer films, such as polyethylene, polypropylene, cellulose, and polyethylene terephthalate.

The cover sheets 144, 244 function to protect the film layers until ready for use. These cover sheets generally are a polymer film, such as polyethylene, polypropylene, or polyethylene terephthalate.

The unimaged, unexposed holographic film layer 102' is a dry film of photohardenable or photosensitive material. Holograms are recorded in materials that produce a spatial pattern of varying refractive index, rather than optical density, when exposed to light. Holographic recording materials are described in a number of references, such as, L. Solymer and D. J. Cook, Volume Holography and Volume Gratings, Academic Press, New York, 1981, Chapter 10, pages 254–304; and W. K. Smothers, B. M. Monroe, A. M. Weber and D. E. Keys, Photopolymers for Holography, SPIE Vol. 1212, Practical Holography IV (1990). Early developments in holography are described by E. N. Leith and J. Upatnieks, Scientific American, 212(6), 24–35 (June 1965). A useful discussion of holography is presented By C. C. Guest entitled Holography in Encyclopedia of Physical Science and Technology, Vol. 6, pages 507–519, R. A. Myers, Ed., Academic Press, Orlando, Fla., 1987. Preferred recording materials for use in this invention are photopolymerizable compositions, dichromated gelatin, and silver halide emulsions.

Photopolymerizable compositions are disclosed in Haugh, U.S. Pat. No. 3,658,526; Chandross, U.S. Pat. No. 3,993,485; and Fielding, U.S. Pat. Nos. 4,535,041 and 4,588,664. Preferred photopolymerizable compositions are disclosed in Keys, U.S. Pat. No. 4,942,102; Monroe, U.S. Pat. No. 4,942,112; Smothers, U.S. Pat. No. 4,959,284; Trout, U.S. Pat. No. 4,963,471; Smothers, U.S. Pat. No. 5,236,808; and Smothers, U.S. Pat. No. 5,256,520; as well as in U.S. patent application Ser. Nos. 08/146,817 and 08/146,816. The compositions used in the preferred recording film element are dry films.

As used throughout this specification, "fully sensitized" means that the material is photosensitive to light within at least the range of about 300 to about 700 nanometers wavelengths. See U.S. Pat. No. 4,917,977 which discloses methods for making fully sensitized, and non-fully sensitized or wavelength selectively sensitized, holographic materials. In addition, see the following related and more recent patents disclosing use of photosensitizers: Smothers, U.S. Pat. No. 5,204,467; Smothers, U.S. Pat. No. 5,236,808; and Smothers, U.S. Pat. No. 5,256,520.

The diffusing element 245 is a dry film that comprises a monomer, an initiator system, and a binder, on a support. When the diffusion element is laminated to the recording element 102 that contains a hologram, the monomer diffuses into the film element, thereby increasing the wavelength of light reflected by the hologram.

Any of the numerous conventional photopolymerizable monomers may be used in the diffusing element 245 provided the selected monomer is diffusable into the recording element 102' and compatible with it. If the holographic recording element 102' is a photopolymer, the monomer in the diffusing element 245 may be the same as that contained in the recording element 102, a monomer with a similar refractive index, a totally different monomer, or a mixture of various monomers.

The initiator system in the diffusing element 245 may be any of the conventional initiator systems used in photopolymerizable compositions. Initiator systems that do not contain a component which absorbs visible radiation may be used to advantage. Diffusion of materials that absorb visible light may impart unwanted color to the final hologram. Initiator systems that do not absorb visible light can not be irradiated by visible radiation.

The binder in the diffusing element 245 may be any of the conventional binders used in photopolymerizable compositions. If the diffusing element 245 and recording element 102' have the same binder or if the binder of the film is a compatible transparent material, the diffusion element 245 may be permanently laminated to the photosensitive film to serve as a protective overcoat.

Additional components may be present in the diffusing element 245 provided they are compatible with the composition and are either non-diffusable into the recording element 102' or do not adversely affect the properties of recording element. For example, the diffusion element 245 may contain plasticizers, thermal stabilizers, coating aids, antihalation agents, and the like that are commonly added to photopolymerizable compositions.

The diffusion element 245 may be prepared using conventional coating techniques. The ingredients of the dry film are dissolved in a suitable solvent, coated onto the support, and the solvent evaporated. After the solvent has evaporated, the coversheet is laminated to the dry film. Alternatively, the dry film may be coated onto the coversheet, and the support laminated to the dry film. Suitable materials for the diffusing element, methods of making the diffusing element, and methods of using diffusing elements to color tune holograms are described in U.S. Pat. Nos. 5,182,180 and 4,959,283, which are incorporated by reference herein.

Antireflection plate 148 functions to prevent back reflection of imaging light and is commercially available from CVI Laser Corporation with offices at Albuquerque, N. Mex.

The photomask layer 170 functions to block all light from passing through the layers and can be made of patterned chromium or silver halide on glass. Alternatively, imagewise radiation can be carried out through a half-tone or continuous tone transparency. Other means of imagewise irradiation include exposure through a transmissive device, such as an absorptive filter, and exposure using a scanning laser, electron beam, or the like.

The index matching fluid layer 152 is preferably hydrocarbons and most preferably is Isopar® L available from Chemcentral Corporation with offices at Southwestern Pennsylvania 19399 and Cargille Al.59 available from R.P. Cargille Laboratories, Inc. at Cedar Grove, N.J. 07009.

The antihalation layers 178, 278 function to absorb light and prevent back reflection. Suitable antihalation layers are black spray paint on float glass or highly absorbing films such as Chronar® commercially available from E. I. du Pont de Nemours and Company of Wilmington, Del.

EXAMPLES

The advantageous properties of this invention can be observed by reference to the following examples which illustrate, but do not limit, the invention. In these Examples, parts and percents are by weight unless otherwise indicated. Terms or abbreviations used throughout the examples are defined the following glossary.

GLOSSARY

CTFE Chlorotrifluoroethylene

DE (%) Diffraction efficiency expressed as a percent; DE (%)=$I_{dif}/I_o \times 100$, where $I_{dif}$ is the intensity of the diffracted beam of actinic radiation and $I_o$ is the intensity of the incident beam corrected for absorption in the film sample and for spurious reflections off the film sample FC-430 Fluorad® FC-430; fluoroaliphatic polymeric esters; CAS 11114-17-3; 3M Company, St. Paul, Minn.

GA2-red OmniDex® GA2-red color tuning film (CTF); E. I. du Pont de Nemours, Inc., Wilmington, Del.; OmniDex® is a registered trademark of E. I. Du Pont de Nemours and Company Isopar® L An aliphatic hydrocarbon product; Exxon Company, Houston, Tex.

JAW Cyclopentanone, 2,5-bis [2,3,6,7-tetrahydro-1H,5H-benzo[i,j]quinolizin-9-yl)methylene]-

MMT 4-Methyl-4H-1,2,4-triazole-3-thiol; CAS 24854-43-1

Mylar® film Polyethylene terephthalate film; registered trademark of E. I. du Pont de Nemours and Company, Wilmington, Del.

NVC N-Vinyl carbazole; 9-vinyl carbazole; CAS 1484-13-5

Photomer® 4039 Phenol ethoxylate monoacrylate; CAS 56641-05-5; Henkel Process Chemical Company, Ambler, Pa.

PI-B 4,5-diphenyl-1-[4,5-diphenyl-2-(2,3,5-trichlorophenyl)-2H-imidazol-2-yl]-2-(2,3,5-trichlorophenyl)-1H-imidazole Pl-A 4,5-bis(4-chlorophenyl)-1-[4,5-bis(4-chlorophenyl)-2-(2,3,5-trichlorophenyl)-2H-imidazol-2-yl]-2-2,3,5-trichlorophenyl)-1 H-imidazole PVA Poly (vinyl alcohol)

Sartomer 349 Ethoxylated bisphenol A diacrylate; CAS 24447-78-7; Sartomer Company, West Chester, Pa.

SD-A 3-[(1-ethyl-1,2,3,4-tetrahydro-6 quinolinyl)methylene]-2,3-dihydro-4H-1-benzopyran-4-one; CAS 75535-23-8.

SD-B 2,4-bis[(3-ethyl-2(3H)-benzothiazolylidene) ethylidene]-8-methyl-8-azabicyclo[3.2.1]octan-3-one; CAS 154482-35-6

SD-C 1-ethyl-2-[[3-[(1-ethyl-1,3-dihydro-5-methoxy-3,3-dimethyl-2H-indol-2-ylidene)methyl]-2-hydroxy-4-oxo-2-cyclobuten-1-ylidene]methyl]-5-methoxy-3,3-dimethyl-3H-indolium hydroxide inner salt; CAS—none on computer files (STN International)

Spot# Area/pixel/region (identified by number) of the HRF that is imaged in the examples of this specification TFE Tetrafluoroethylene TMPTMA Trimethylol propane trimethacrylate VAc Vinyl acetate VOH Vinyl alcohol ($\lambda$)max (nm) Wavelength of actinic radiation showing the maximum diffraction efficiency (DE (%)) from the transmission spectrum of a holographic mirror

EXAMPLE 1

This example illustrates the formation of a high efficiency 3-color holographic mirror in single holographic photopolymer layer. Furthermore, it demonstrates the capability to form high efficiency multicolor mirrors required for color filters with 2-color mirrors and virtual black border with 3-color mirrors.

To prepare the holographic (photopolymer) recording film which is utilized in this example, a coating solution was prepared containing 66.0 weight % of tetrafluoroethylene/vinyl acetate (TFE/VAc) binder copolymer (containing 19.4 mole % TFE and 80.6 mole % vinyl acetate and having inherent viscosity=1.48 deciliters/gram measured at 30° C.), 21.0 weight % of Photomer® 4039, 6.0 weight % of NVC, 3.0 weight % of Sartomer 349, 3.0 weight % of PI-B, 1.0 weight % of MMT, 0.22 weight % of FC-430, 0.075 weight % of JAW, and 0.034 weight % of SD-C in 19:1 dichloromethane/methanol. The solution was extrusion dye coated onto a 50 μm Mylar® base sheet at a speed of about 31 ft/min (15 cm/sec) using a web coater. The solvent was evaporated by passing the coated film through a three zone drier. The first zone was at 120° F. (49° C.), the second at 140° F. (60° C.), and the third at 160° F. (71° C.). A coversheet of 23 micron Mylar® (polyethylene terephthalate film) was laminated to the coating as it exited the drier. Dry coating thickness was 20 μm.

The coversheet was removed from the photopolymer and the tacky photopolymer was laminated to a section of 100 mm×125 mm×3.2 mm float glass. Excess film was trimmed away so that the laminated film fit within the edges of the glass substrate. The base sheet was left in place during subsequent processing. We refer to the structure of base/ holographic photopolymer and glass plate as the imaging plate. The film side of the imaging plate was coupled to an anti-reflection (AR) plate using Isopar® L (Exxon) to provide a good match of the refractive index of the film to the AR plate. On the opposite side of the imaging plate, a front-surface aluminum mirror was coupled to the surface using the same index matching fluid. Pressure was applied to the stack of plates to provide thin, even index matching fluid layers. The stack of plates was then mounted in a conventional plate holder mounted on an imaging stage and allowed to settle for more than 30 seconds.

An argon ion laser with emissions at 458 nm, a diode-pumped, frequency-doubled YAG laser with emissions at 532 nm and a krypton ion laser with emissions at 647 nm were combined by appropriate dichroic mirrors in the conventional way to form a 3-color laser beam. This 3-color beam was passed through achromatic optics to form an expanded, collimated, 3-color beam. A shutter was installed between the expansion optics and the imaging stage. The imaging plate was rotated on the imaging stage such that the 3-color laser beam direction was perpendicular to the imaging stack.

Holographic mirrors were formed by exposing with the collimated laser beam oriented perpendicular to the film plane and passing, in order, through the anti-reflection plate, Isopar® L layer, base sheet, holographic photopolymer, glass plate and Isopar® L layer and then reflecting back onto itself off the mirror. The exposure energy of the imaging beam was 8.6 mJ/cm$^2$ at 647 nm, 2.9 mJ/cm$^2$ at 532 nm and 2.2 mJ/cm$^2$ at 458 nm. Four 20 mm diameter regions were formed on the plate using identical imaging conditions. The imaging plate was translated to an unimaged region of the film plate after each exposure and allowed to settle for 30 seconds before a subsequent exposure. After imaging, the AR plates, front surface mirror and Isopar® L layers were removed.

The imaging plate was overall exposed to ultraviolet and visible light from a Theimer-Strahler #5027 mercury-arc lamp (Exposure Systems Corp., Bridgeport, Conn.) mounted in a Douthitt DCOP-X exposure unit (Douthitt Corp., Detroit, Mich.) for 120 sec (about 150 mJ/cm$^2$). The imaging plate was thermally processed by heating at 120° C. for 2 hours in a forced-air convection oven.

The transmission spectra of the holographic mirror was recorded using a standard double-beam spectrophotometer (Perkin-Elmer model Lambda-9) with the sample beam oriented perpendicular to the hologram film plane. The results are shown in Table 1 and demonstrate that three high efficiency holographic mirrors (i.e., a 3-color holographic mirror) have been formed at the three wavelengths (448, 520, and 633 nm) within a single photopolymer layer.

TABLE 1

| spot # | λmax (nm) | DE (%) | λmax (nm) | DE (%) | λmax (nm) | DE (%) |
|---|---|---|---|---|---|---|
| 1 | 633.7 | 88.8 | 520.6 | 92.1 | 448.5 | 90.0 |
| 2 | 633.7 | 88.8 | 520.8 | 91.3 | 448.6 | 89.0 |
| 3 | 633.7 | 89.5 | 520.7 | 89.5 | 448.5 | 86.2 |
| 4 | 633.9 | 87.7 | 520.8 | 91.5 | 448.7 | 86.8 |

EXAMPLE 2

This example demonstrates the ability to alter the playback wavelength of a 3-color holographic mirror using a color tuning film, which ability is necessary for formation of holographic mirrors suitable for use as holographic LCD color filters made according to the process of this invention.

Holographic mirrors were produced as described in Example 1. After heat processing, base film was removed from two of the eight holographic mirror regions. A color tuning film (DuPont OmniDex® GA2-red color tuning film (CTF)) was stripped of its cover sheet and the tacky photopolymer was laminated to the exposed photopolymer surface of the multicolor mirrors. The plate bearing the holographic mirrors and color tuning film was then thermally processed by heating at 100° C. for 30 minutes in a forced-air convection oven. The transmission spectra of the holographic mirror was recorded using a standard double-beam spectrophotometer (Perkin-Elmer model Lambda-9) with the sample beam oriented perpendicular to the hologram film plane. Results for two unprocessed 3-color holographic mirrors are shown in Table 2, which illustrate that there is no shift in playback wavelength without color tuning (unprocessed case). Results for two processed 3-color holographic mirrors are shown in Table 3, which illustrate that significant shifts occur in playback wavelength with color tuning (processed case).

TABLE 2

| spot # | λmax (nm) | DE (%) | λmax (nm) | DE (%) | λmax (nm) | DE (%) |
|---|---|---|---|---|---|---|
| 1 | 633.3 | 90.0% | 520.4 | 91.7% | 448.3 | 85.9% |
| 2 | 633.8 | 91.7% | 520.9 | 93.5% | 448.5 | 83.4% |

TABLE 3

| spot # | λmax (nm) | DE (%) | λmax (nm) | DE (%) | λmax (nm) | DE (%) |
|---|---|---|---|---|---|---|
| 1 | 756.5 | 86.8% | 621.0 | 83.4% | 528.6 | 63.7% |
| 2 | 761.7 | 85.5% | 625.1 | 80.9% | 537.2 | 62.8% |

EXAMPLE 3

In this example, three sets of 16 high efficiency single-color mirrors are formed in three separate plates using the same single holographic photopolymer layer in each case. The three sets of holographic mirrors are individually laminated together to form a three layer photopolymer stack with red mirrors in one layer of the stack, green mirrors in a second layer of the stack and blue mirrors in another layer of the stack. All three layers are swelled by applying a single color tuning film layer to the three layer holographic stack and heating. This is a similar demonstration to example 2, but with each color residing in a different part of the total holographic film.

To prepare the holographic (photopolymer) recording film which is utilized in this example, a coating solution was prepared containing 65.7 weight % of tetrafluoroethylene/chlorotrifluoroethylene/vinyl acetate/vinyl alcohol binder polymer (containing 15.2 mole % TFE, 18.6 mole % CTFE, 11.4 mole % VOH, and 54.8 mole % VAc and having inherent viscosity=1.24 deciliters/gram measured at 30° C.), 27.0 weight % of Photomer® 4039, 2.0 weight % of TMPTMA, 3.0 weight % of PI-A, 2.0 weight % of MMT, 0.2 weight % of FC-430, 0.045 weight % of SD-B, and 0.015 weight % of SD-C in 19:1 dichloromethane/methanol. The solution was extrusion dye coated onto a 50 μm Mylar® base sheet at a speed of about 31 ft/min (15 cm/sec) using a web coater. The solvent was evaporated by passing the coated film through a three zone drier. The first zone was at 120° F. (49° C.), the second at 140° F. (60° C.), and the third at 160° F. (71° C.). A coversheet of 23 micron Mylar® (polyethylene terephthalate film) was laminated to the coating as it exited the drier. Dry coating thickness was 20 μm.

The coversheet was removed from the photopolymer and the tacky photopolymer was laminated to a section of 100 mm×125 mm×3.2 mm float glass. Excess film was trimmed away so that the laminated film fit within the edges of the glass substrate. The base sheet was left in place during subsequent processing. We refer to the structure of base/holographic photopolymer and glass plate as the imaging plate. The film side of the imaging plate was coupled to an anti-reflection (AR) plate using Isopar® L (Exxon) to provide a good match of the refractive index of the film to the AR plate. On the opposite side of the imaging plate, a front-surface aluminum mirror was coupled to the surface using the same index matching fluid. Pressure was applied to the stack of plates to provide thin, even index matching fluid layers. The stack of plates was then mounted in a conventional plate holder mounted on an imaging stage and allowed to settle for more than 30 seconds.

An argon ion laser with emissions at 458 nm, a dye laser with emissions at 576 nm and a krypton ion laser with emissions at 647 nm were combined by appropriate dichroic mirrors in the conventional way to form a 3-color laser beam. This 3-color beam was passed through achromatic optics to form an expanded, collimated, 3-color beam. Shutters were installed so that each color could be individually controlled. The imaging plate was rotated on the imaging stage such that the 3-color laser beam direction was perpendicular to the imaging stack.

Holographic mirrors were formed by exposing with the collimated laser beam oriented perpendicular to the film plane and passing, in order, through the anti-reflection plate, Isopar® L layer, base sheet, holographic photopolymer, glass plate and Isopar® L layer and then reflecting back onto itself off the mirror. Three plates were imaged separately with sixteen spots, each at a single wavelength. The exposure energy of the imaging beam for the plate imaged at 647 nm was 50 mJ/cm$^2$, for the plate imaged at 576 nm was 50 mJ/cm$^2$ and for the plate imaged at 458 nm was 50 mJ/cm$^2$. Sixteen 20 mm diameter regions were formed on each plate using identical imaging conditions. The imaging plate was translated to an unimaged region of the film plate after each exposure and allowed to settle for 30 seconds before a subsequent exposure. After imaging, the AR plates, front surface mirror and Isopar® L layers were removed.

After all three plates were processed as above, the base and photopolymer of the plate imaged at 647 nm and the base and photopolymer of the plate imaged at 576 nm were delminated for their respective glass substrates and the photopolymer side of each was laminated at a temperature of about 60° C. to each other with the proper alignment so that the sixteen spots of each film laid one over top of the other. The resulting sandwich of base/photopolymer/photopolymer/base was heated to 120° C. for 5 minutes and then allowed to cool. The base was removed from the photopolymer imaged at 647 nm. The base and photopolymer of the plate imaged at 458 nm was then delaminated from its glass substrate and the photopolymer side was laminated to the exposed photopolymer layer from the previous lamination, again with the sixteen spots aligned to each other. The lamination was performed at about 60° C. and resulted in overlapping red, green and blue mirrors. The sandwich of base/photopolymer/photopolymer/photopolymer/base was then heat at 120° C. for 5 minutes. The base from the photopolymer imaged at 458 nm was delaminated and another layer of unexposed photopolymer was laminated to the three-photopolymer layer stack. This film served as the diffusion element much as the GA2-red color tuning film in the previous examples did.

For each set of two mirrors within this sandwich of base/photo-polymer/photopolymer/photopolymer/unexposed photopolymer/base was exposed to ultraviolet and visible light from the unexposed photopolymer side using a Theimer-Strahler #5027 mercury-arc lamp (Exposure Systems Corp., Bridgeport, Conn.) mounted in a Douthitt DCOP-X exposure unit (Douthitt Corp., Detroit, Mich.) under 8 different conditions: 0,7,12,16.6,19.8,22.3,36 and 39.3 mJ/cm$^2$ (340–380 mm). The imaging plate was then thermally processed by heating at 120° C. for 2 hours in a forced-air convection oven.

The transmission spectra of the holographic mirror was recorded using a standard double-beam spectrophotometer (Perkin-Elmer model Lambda-9) with the sample beam oriented perpendicular to the hologram film plane. The results are shown in Table 4. UV exposures greater than 16.6 mJ/cm$^2$ are not shown because they were nearly identical to the 16.6 mJ/cm$^2$ condition.

TABLE 4

| E (mJ/cm2) | λmax | DE (%) | λmax | DE (%) | λmax | DE (%) |
|---|---|---|---|---|---|---|
| 0 | 695.3 | 95% | 614.9 | 99% | 491.5 | 98% |
| 7 | 656.2 | 96% | 584.1 | 99% | 461.8 | 98% |
| 12 | 649.7 | 95% | 577.6 | 99% | 456.4 | 98% |
| 16.6 | 646.8 | 95% | 575.6 | 99% | 454.6 | 99% |

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A color tuned volume holographic optical element, for use with a light source having spectral power peaks at a first color, a second color, and a third color, comprising:

a photohardened holographic recording film element comprising a first plurality of pixel volumes, a second plurality of pixel volumes, and a third plurality of pixel volumes;

each one of the first pixel volumes including a color tuned volume holographic mirror that passes light with a first color wavelength band and reflects light with a second color wavelength band, a third color wavelength band and a fourth color wavelength band and passes all other color wavelength bands;

each one of the second pixel volumes including a non-color tuned volume holographic mirror that passes light with the second color wavelength band and reflects light with the first color wavelength band, the third color wavelength band and a fifth color wavelength band and passes all other color wavelength bands;

each one of the third pixel volumes including a color tuned volume holographic mirror that passes light with the third color wavelength band and reflects light with the first color wavelength band, the second color wavelength band, and a sixth color wavelength band and passes all other color wavelength bands.

2. The element of claim 1, wherein the first color wavelength band has a width of at least 5 nanometers and includes 634 namometer, the second color wavelength band has a width of at least 5 nanometers and includes 528 nanometer, and the third color wavelength band has a width of at least 5 nanometers and includes 440 nanometer.

3. The element of claim 1, wherein the fourth color wavelength band has a width of at least 5 nanometers and includes 760 nanometer, the fifth color wavelength band has a width of at least 5 nanometers and includes 367 namometer, and the sixth color wavelength band has a width of at least 5 nanometers and includes 912 nanometer.

4. The element of claim 1, wherein the film element comprises a single photohardened holographic recording film.

5. The element of claim 1, wherein the film element comprises a plurality of photohardened holographic recording films.

6. In a transmission liquid crystal display apparatus, comprising, in order:

a light assembly, Comprising a light source, which emits light with spectral peaks at a first color wavelength band, a second color wavelength band and a third color wavelength band;

a first light polarizer for passing light from the light assembly having a first polarization;

a liquid crystal display element for selectively modifying the polarization of the light passing through an array of cells such that the polarization of light passing through a first set, a second set or a third set of the cells can be changed to a second polarization;

a color tuned holographic multicolor transmission filter comprising a first plurality of pixel volumes, a second plurality of pixel volumes, and a third plurality of pixel volumes;

each one of the first pixel volumes including a color tuned volume holographic mirror that passes light with the first color wavelength band and reflects light with the second color wavelength band, the third color wavelength band and a fourth color wavelength band;

each one of the second pixel volumes including a non-color tuned volume holographic mirror that passes light with the second color wavelength band and reflects light with the first color wavelength band, the third color wavelength band and a fifth color wavelength band; and each one of the third pixel volumes including a color tuned volume holographic mirror that passes light with the third color wavelength band and reflects light with the first color wavelength band, the second color wavelength band and a sixth color wavelength band; and a second light polarizer for passing light having a second polarization, such that (1) when the liquid crystal display element modifies the polarization of the light passing through the first set of cells to the second polarization, the light passes into the first pixel volumes in which the first volume holographic mirrors pass light with the first color wavelength band through the second polarizer to a viewer, (2) when the liquid crystal display element modifies the polarization of the light passing through the second set of cells to the second polarization, the light passes into the second pixel volumes in which the second volume holographic mirrors pass light with the second color wavelength band through the second polarizer to the viewer, and (3) when the liquid crystal display element modifies the polarization of the light passing through the third set of cells to the second polarization, the light passes into the third pixel volumes in which the third volume holographic mirrors pass light with the third color wavelength band through the third polarizer to the viewer.

7. The transmission liquid crystal display apparatus of claim 6, further comprising a pre-filter adjacent the light assembly for reflecting or absorbing light with other color wavelength bands.

8. The transmission liquid crystal display apparatus of claim 6, further comprising a pre-filter adjacent the light assembly for reflecting and absorbing light with other color wavelength bands.

9. A method for making a first color tuned volume holographic optical element, comprising:

a holographic recording film element comprising a first plurality of pixel volumes, a second plurality of pixel volumes, and a third plurality of pixel volumes;

each one of the first pixel volumes including a color tuned volume holographic mirror that passes light with a first color wavelength band and reflects light with a second color (e.g., Green) wavelength band, a third color wavelength band and a fourth color wavelength band;

each one of the second pixel volumes including a non-color tuned volume holographic mirror that passes light with the second color wavelength band and reflects light with the first color wavelength band, the third color wavelength band and a fifth color wavelength band; and each one of the third pixel volumes including a color tuned volume holographic mirror that passes light with the third color wavelength band and reflects light with the first color wavelength band, the second color wavelength band and a sixth color wavelength band; the method comprising:

holographically exposing the film element with coherent or substantially coherent light in a uniform manner to record a second volume holographic optical element adapted to uniformly reflect light having the fifth color wavelength band, the third color wavelength band and the first color wavelength band;

contacting a solid or substantially solid diffusing element containing a diffusable monomer with the film element; and imagewise exposing the diffusing element to actinic radiation to polymerize the monomer to varying degrees, the imagewise exposure creating three sets of pixels, wherein, each first pixel, which corresponds to each first pixel volume, is subjected to a partial polymerization, each second pixel, which corresponds to each second pixel volume, is subjected to a substantially complete polymerization, and each third pixel, which corresponds to each third pixel volume, is subjected to substantially no polymerization, to selectively modify the wavelength response of the holographic optical element by the diffusion of monomer from the diffusion element to form the first color tuned volume holographic optical element.

10. A method for making a first color tuned volume holographic optical element, comprising:

a holographic recording film element comprising a first plurality of pixel volumes, a second plurality of pixel volumes, and a third plurality of pixel volumes;

each one of the first pixel volumes including a color tuned volume holographic mirror that passes light with a first color wavelength band and reflects light with a second color wavelength band, a third color wavelength band and a fourth color wavelength band;

each one of the second pixel volumes including a non-color tuned volume holographic mirror that passes light with the second color wavelength band and reflects light with the first color wavelength band, the third color wavelength band and a fifth color wavelength band; and each one of the third pixel volumes including a color tuned volume holographic mirror that passes light with the third color wavelength band and reflects light with the first color wavelength band, the second color wavelength band and a sixth color wavelength band; the method comprising:

holographically exposing the film element with coherent or substantially coherent light to record a second volume holographic optical element adapted to uniformly reflect light having a fifth color wavelength band, the third color wavelength band and the first color wavelength band; imagewise exposing a solid or substantially solid diffusing element containing a diffusable monomer to actinic radiation to polymerize the monomer to varying degrees, the imagewise exposure creating three patterns of pixel regions, wherein each first pixel region, which corresponds to each first pixel volume, is subjected to a partial polymerization, each second pixel region, which corresponds to each second pixel volume, is subjected to a substantially complete polymerization, and each third pixel region, which corresponds to each third pixel volume, is subjected to substantially no polymerization: and contacting the film element with the diffusing element to selectively modify the wavelength of light response of the second volume holographic optical element by diffusion of the monomer from the solid diffusing element to form the first color tuned volume holographic optical element.

11. The method of claim 9 or 10, further comprising, after the holographically exposing step and before the contacting step, curing the holographic recording film element by exposing it to actinic radiation to substantially polymerize any monomer and fix the holographic mirrors in the film element.

12. The method of claim 9 or 10, further comprising, after the imagewise exposing and contacting steps, heating the holographic recording film to increase the refractive index modulation, efficiency and bandwidth of the holographic mirrors.

13. The method of claim 9 or 10, wherein the film element comprises a single, substantially solid, holographic recording film.

14. The method of claim 9 or 10, wherein the film element comprises a plurality of substantially solid, holographic recording films.

15. The method of claim 9 or 10, wherein the first color wavelength band has a width of at least 5 nanometers and includes 634 nanometer, the second color wavelength band has a width of at least 5 nanometers and includes 528 nanometer, and the third color wavelength band has a width of at least 5 nanometers and includes 440 nanometer.

16. The method of claim 15, wherein the fourth color wavelength band has a width of at least 5 nanometers and includes 760 nanometer, the fifth color wavelength band has a width of at least 5 nanometers and includes 367 nanometer, and the sixth color wavelength band has a width of at least 5 nanometers and includes 912 nanometer.

* * * * *